United States Patent [19]

Feuerstein et al.

[11] 4,424,921
[45] Jan. 10, 1984

[54] MEASURED DISPENSER

[75] Inventors: Andrew E. Feuerstein, East Hills; Michael F. Aprea, Franklin Square, both of N.Y.

[73] Assignee: Measure Control Devices, Inc., Hempstead, N.Y.

[21] Appl. No.: 336,575

[22] Filed: Jan. 4, 1982

[51] Int. Cl.³ ............................................. G01F 11/28
[52] U.S. Cl. .................................... 222/456; 222/438
[58] Field of Search .............. 222/438, 456, 454, 543, 222/207, 211, 455, 464

[56] References Cited

U.S. PATENT DOCUMENTS

| | | | |
|---|---|---|---|
| 1,280,654 | 10/1918 | Bream | 222/456 |
| 1,877,808 | 9/1932 | Cagliostro | 222/456 |
| 2,989,216 | 6/1961 | Moro-Lin | 222/211 X |
| 4,077,547 | 3/1978 | Donoghue | 222/207 |

Primary Examiner—Stanley H. Tollberg
Attorney, Agent, or Firm—Schwartz & Weinrieb

[57] ABSTRACT

A dispensing apparatus includes a cylindrical container having at least one annular channel in its side wall; a measuring funnel having an apron-like rim around the circumference of its inlet dimensioned to be "snapped into" the channel for securely positioning the funnel in the container; a tubing rigidly connected between a centrally located hole in the cover for said container and the outlet of the funnel; and a plurality of holes are included in the funnel in substantially the same plane between its outlet and inlet, whereby material placed in the container above the funnel partly flows through the holes to form a volume of material between the plane of the holes and the bottom of the container, the latter representing a measured quantity of the material that is dispensed via the tube when the container is turned over. In another embodiment, a plurality of channels are provided in the wall of the container, permitting the level of the funnel within the container to be changed for selecting a desired measured amount of material to be dispensed.

14 Claims, 5 Drawing Figures

MEASURED DISPENSER

TECHNICAL FIELD

The field of the present invention relates generally to dispensing devices, and more specifically, to devices for dispensing a measured or metered amount of a material from a container.

BACKGROUND ART

Many different devices are known in the prior art for permitting a measured amount of a fluid or particular material to be dispensed from a container, where the container holds a substantially greater amount of the material relative to the measured amount. For example, Yasso, in U.S. Pat. No. 1,919,582, teaches a dispensing device including a cylindrical container with a primary upper reservoir, and a secondary lower reservoir, the reservoirs being separated by a funnel-like means having an inlet protruding into the secondary reservoir, and an outlet into the upper reservoir. A plurality of open slits are equally spaced around the circumference of the funnel, and are directed from the circumference of the outwardly flaring portion of the funnel toward the outlet or inwardly flaring portion of the funnel. A tube is connected between the outlet of the funnel and a centrally located hole in the top of the container. Particulate material, such as sugar, salt, or pepper, for example, can be loaded into the upper reservoir. The slits in the funnel permit some of the material to flow from the upper reservoir into the lower reservoir and the funnel. The material contained in the lower reservoir and funnel represents a measured amount. When the container is inverted, this measured amount of material is dispensed from the end of the tube at the top of the container. When the container is next placed upright, the process can be repeated, so long as sufficient material remains in the upper reservoir.

Yasso improved his above-mentioned dispensing device as shown in U.S. Pat. No. 2,704,623. His improved version elminiates the lower reservoir, and permits the inlet or outwardly flaring portion of the funnel to rest on the bottom of the container. The upper end of the tube is secured by the top of the container. Also, instead of slits, as in his prior device, Yasso now includes a plurality of evenly spaced inlet notches around the circumference of the inlet of the funnel, and directed toward the outlet of the funnel.

Numerous problems are associated with the Yasso devices. For example, in the products covered by above-mentioned Yasso Patents, permit granular or large particles of the normally small grained material, that have fallen to and collected at the bottom of the main reservoirs of the containers, to clog the slots or slits and reduce or prevent accurate dispensing of a measured amount of material. Also, in Yasso, U.S. Pat. No. 2,704,623, the lower or inlet portion of the funnel may have a tendency to move or rock and sometimes become dislodged which would affect both its ability to provide desired measurements as well as its desired function. In addition, neither Yasso nor other known prior art devices provide for user selectivity of the measured amount. Devices for dispensing a measured amount of a liquid are shown in Hentschke et al, U.S. Pat. No. 2,717,776, and Ladwig et al U.S. Pat. No. 3,224,652.

DISCLOSURE OF INVENTION

Briefly, the present invention overcomes the problems of the prior art by providing a dispenser including a grooveway or channel in its inner wall proximate the bottom of the container, a measuring funnel having an apron-like flange or rim arount the circumference of its inlet or outwardly flaring end, the flange and funnel being dimensioned for permitting the flange to be "snapped into" the channel of the container, means for rigidly securing a tubing between the outlet of the funnel and the top of the container, and at least one arc-like slot located substantially above the inlet of the funnel and bottom of the container. A plurality of annular channels can be provided along the side wall of the container for providing a user the ability to change the location of the funnel, and for selecting a desired measured amount.

BRIEF DESCRIPTION OF THE DRAWINGS

The invention will be hereinafter more specifically explained with reference to some exemplary embodiments depicted in the accompanying drawings, wherein like items are indicated by the same reference designation.

BEST MODE OF CARRYING OUT THE INVENTION

Figure 1:
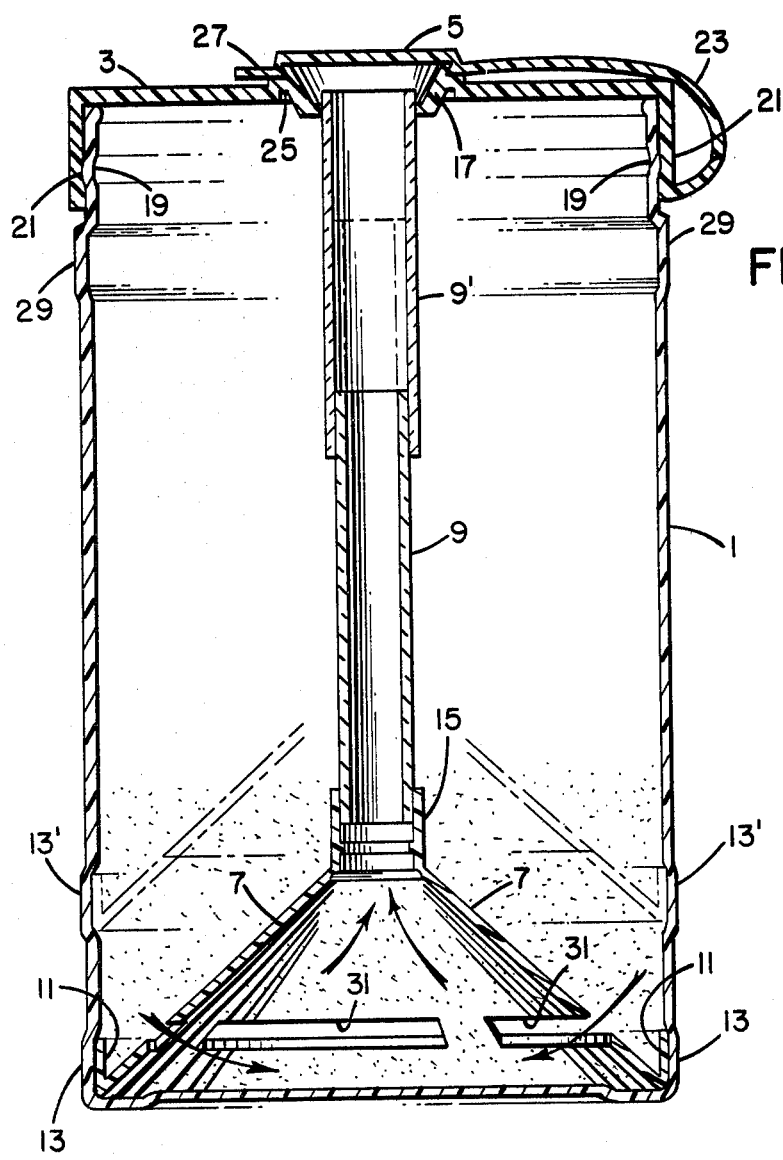
FIG. 1 is a vertical sectional view of one embodiment of the invention.

As shown in FIGS. 1 through 5, one embodiment of the invention includes a container 1, a top 3 for the container 1 having an integral cap 5, a funnel 7, and a tube 9. The Note that for this embodiment the tubes 9,9′ are considered as a single tube 9. funnel 7 includes an apron-like flange or rim 11 which snaps into an annular grooveway or channel 13 proximate the bottom of the container 1. A collar-like outlet 15 of the funnel 7 is dimensioned for rigidly securing one end of the tube 9 to the funnel 7. A funnel-like pedestal 17 centrally located in the top 3, includes a centrally located hole for securing the other end of the tube 9, as shown. As annular rib 19 proximate the uppermost portion and forming part of the walls of the container 1, coacts with an annular groove 21 of the top 3, for providing "snap" fitting and a tight seal between the top 3 and container 1. A strap 23, integral with the cap 5 and top 3, provides connection therebetween. The cap 5 is dimensioned to "snap" onto the upper portion of the funnel-like pedestal 17, with the bottom edge of the cap 5 substantially abutting the annular step-like portion 25 of top 3. A tab 27 is provided on the cap 5 for facilitating the removal of the cap 5 from the pedestal 17. An annular rib 29 is provided for strengthening and stiffening the upper portion of container 1.

Another embodiment of the invention can be provided, as shown in FIG. 1, by including additional channels 13′, of any practical number (only two are shown for simplification of illustration), for permitting a user of the measuring invention to select a desired measured amount for dispensing by snapping the funnel 7 into the appropriate channel 13, or 13', or so forth. When such selectivity for the measured amount is provided, the tube 9 must be made collapsible. By adding a concentric section of tubing 9' to tubing 9 as shown, such collapsibility can be obtained, for example.

Figure 5:
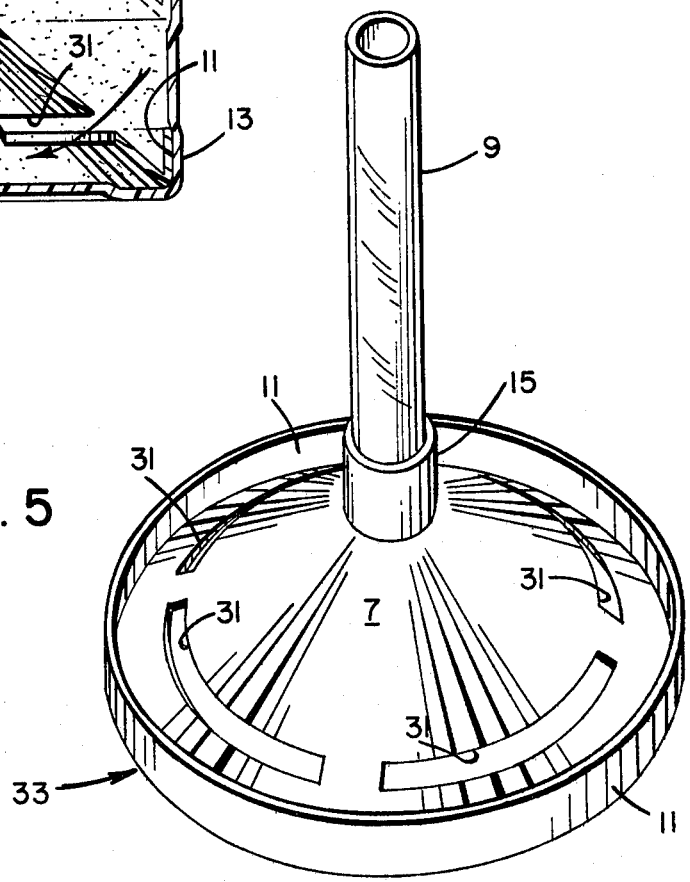
FIG. 5 is an isometric view of the funnel and tube of the one embodiment of the invention.
Figure 2:
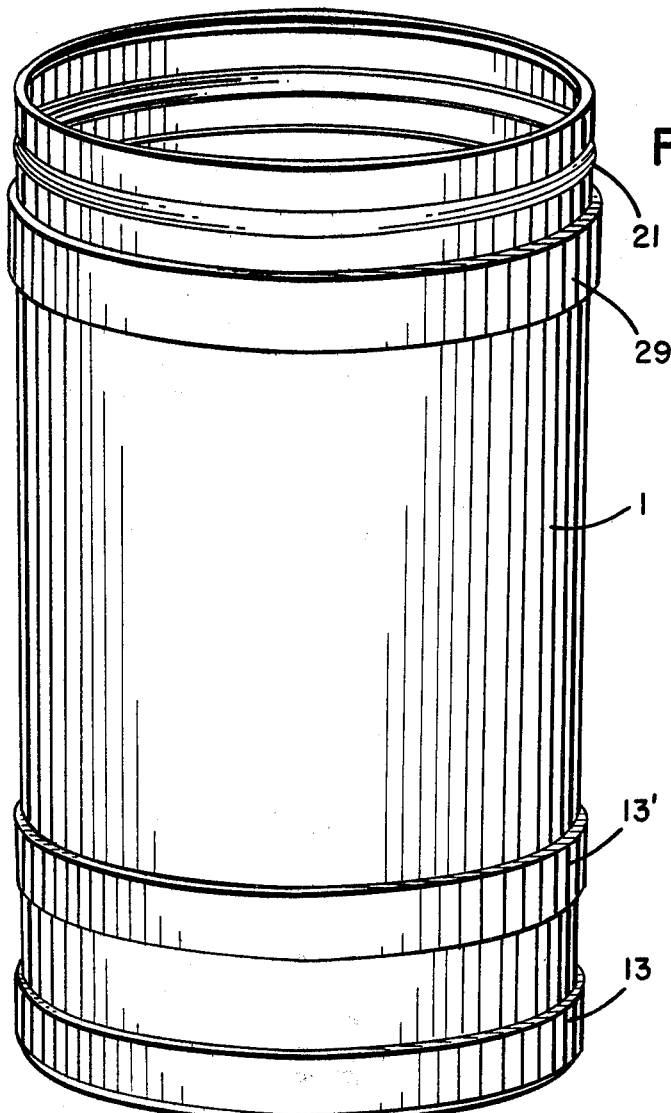
FIG. 2 is an isometric view of a container of one embodiment of the invention.
Figure 3:
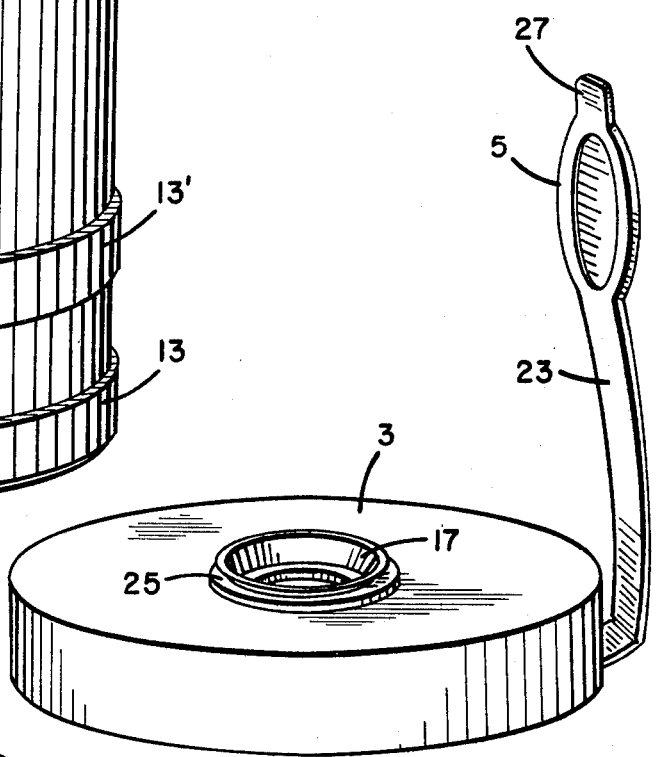
FIG. 3 is an isometric top view of the top for the container.
Figure 4:
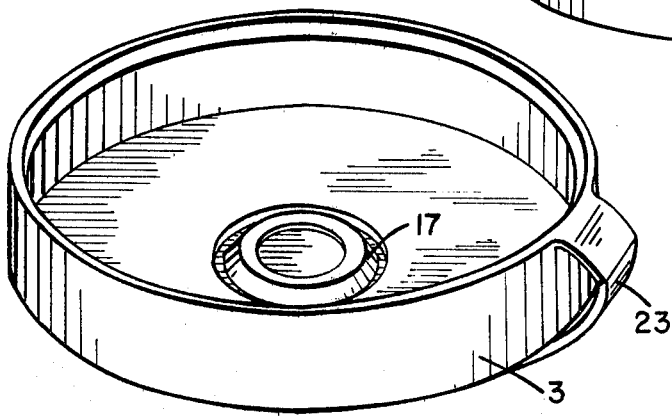
FIG. 4 is an isometric view of the bottom of the top for the container.

In FIG. 5, the funnel 7 is shown to include a plurality of arc-like slots or openings 31 substantially evenly spaced in the same plane, substantially above the bottom edge or inlet 33, in this example. The openings 31 can be configured in other shapes, such as circles, triangles, and so forth; they can also be positioned differently. However, as previously indicated, by positioning the openings somewhat above the circumference of the inlet edge 33 of funnel 7, that abnormally large granules of the particulate material being dispensed would tend to drop or fall below the openings 31; thereby substantially reducing the tendency of such particles or granules to block or partially block the openings 31. Any blockage of the openings 31 would cause a reduction in the measuring efficiency and deter the intended functioning of the funnel 7.

The various components of the present invention can be fabricated from any suitable material, such as plastic. For example, the container 1 can be fabricated using a blow molded plastic process; the top 3, strap 23, and cap 5 can be molded in one piece; the tubing 9,9' can be extruded plastic; and the funnel 7 can be molded in one piece; the tubing 9,9' can be extruded plastic; and the funnel 7 can be molded plastic. The size and shape of the container 1 can be varied in size and shape, partly dependent upon the type of material to be dispensed, and partly dependent upon the quantity of material to be stored in the container 1.

The dimensional design or shape of the funnel-like insert 7 is partly dependent upon the shape or configuration of the container 1, and partly dependent upon the desired volume control for obtaining a desired measured amount(s) of material. For example, the angle of the sloping part of the funnel 7, and the volume of the portion of the funnel 7 between the inlet 33 and openings 31, at least partly determines the measured quantity of material to be dispensed. If the funnel 7 is positioned in the lowermost channel 13 (see FIG. 1) of container 1, where the lip or edge of the inlet 33 is held substantially flush against the bottom of the container 1, the previously mentioned volume substantially determines the measured amount. However, if the funnel 7 is positioned in another channel of container 1, above channel 13, such as channel 13', then the measured amount is determined partly by the previously mentioned volume of the funnel 7, and partly by the volume of the container 1 below the funnel 7. Also, the openings 31 of funnel 7 are varied in size and shape dependent upon the size of the granules of the material to be dispensed, and upon the desired volume control for the measured amount. Similarly, the inside diameter of the tubing 9, and/or tubing 9,9', is dependent upon the particle size of the material to be dispensed.

We claim:

1. An apparatus for dispensing a measured quantity of material, comprising:
    a container having an annular channel in its side(s), said channel being proximate the bottom of said container;
    a measuring funnel having an inlet at its outwardly flaring end, and a collar-like outlet at the termination of its inwardly flaring end, said funnel further having an apron-like rim around the circumference of its inlet, said funnel and said rim being dimensioned for permitting the rim to be "snapped into" said channel of said container, thereby rigidly holding said funnel in position in said container;
    a tube having one end inserted into and rigidly held by the collar of said funnel; and
    a top for said container, said top including means for rigidly securing the other end of said tubing through the central portion of said top;
    said funnel having its inlet facing the bottom of said container, said funnel further including a plurality of openings or holes in substantially the same plane spaced around its sloping sides, whereby material placed in said container above said funnel flows through said openings to form a volume of said material between the plane of the holes of said funnel and the bottom of said container, the ultimate volume of said material so formed being a measured amount for dispensing via said tube when said container is turned over.

2. The apparatus of claim 1, wherein the openings in said funnel are in a plane substantially above the inlet of said funnel, for reducing the tendency of abnormally large particles of said material from blocking said openings.

3. The apparatus of claim 1 or 2, further including:
    a plurality of annular channels in the side wall(s) of said container, for permitting said funnel to be positioned at a selected level in said container corresponding to a desired measured amount of material to be dispensed.

4. The apparatus of claim 3, further including means for making said tube collapsible between said top and said funnel.

5. An apparatus for dispensing a selective measured quantity of material, comprising:
    a container having a closed bottom, end, an open top, a side wall(s), and a plurality of annular channels in its side wall(s) spaced apart from one another;
    a funnel acting as a measuring means, said funnel having an apron-like rim around the circumference of its outwardly flaring inlet, said funnel and said rim being dimensioned for permitting the rim to be "snapped into" one of said plurality of channels for selecting a desired measured quantity of material to be dispensed, said inlet facing the bottom of said container, said funnel further including a collar-like outlet at the termination of its inwardly flaring outlet end, and a plurality of openings in substantially the same plane between its inlet and outlet;
    tubing means having one end inserted into and rigidly held by the collar of the outlet of said funnel; and
    cover means for covering the top of said container, said cover means including means for rigidly securing the other end of said tubing means at a centrally located hole in said cover means.

6. The apparatus of claim 5, wherein said tubing means includes means for collapsibly changing the length of said tubing means between said funnel and said cover, for accomodating the positioning of said funnel in different ones of said plurality of channels.

7. The apparatus of claim 5, wherein said tubing means includes first and second tubes, said first tube having one end rigidly connected to said cover means, said second tube having one end rigidly connected to the outlet of said funnel, the other ends of said first and second tubes being concentric to one another and slideably interconnected.

8. The apparatus of claim 5, or 6, or 7, wherein the openings in said funnel are in a plane substantially above the inlet of said funnel.

9. A dispensing apparatus for dispensing a measured quantity of material, comprising:
- a cylindrical container having a closed bottom, an open top, and at least one annular channel in its side wall;
- a measuring funnel having an apron-like rim around the circumference of its inlet dimensioned for permitting the rim to be "snapped into" said channel, for securely positioning said funnel in said container, the inlet of said funnel facing the bottom of said container;
- tubing means having one end inserted into and rigidly held by a collar at the outlet of said funnel; and
- cover means for covering the top of said container, said cover means including means for rigidly securing the other end of said tubing means at a centrally located hole in said cover means;
- said funnel further including a plurality of holes in substantially the same plane between its inlet and outlet, whereby material placed in said container above said funnel flows through said holes to form a volume of said material between the plane of the holes and the bottom of said container for dispensing via said tubing means a measured amount of said material when said container is turned over.

10. The dispensing apparatus of claim 9, wherein said holes in said funnel are in a plane substantially above the inlet of said funnel.

11. The dispensing apparatus of claim 9, or 10, further including a plurality of annular channels spaced apart in the side wall of said container, for permitting said funnel to be selectively positioned at the level of one of said channels within said container, said level representing a desired measured amount of material to be dispensed.

12. The dispensing apparatus of claim 11, wherein said tubing means includes means for providing for automatically changing its length between said cover means and said funnel to accommodate the changing of the level of said funnel in said container.

13. The dispensing apparatus of claim 11, wherein said tubing means includes a pair of tubes concentric to and slideably engaging one another between said cover means and said funnel.

14. The dispensing apparatus of claim 13, wherein the holes in said funnel are arc-like in shape and evenly spaced.

* * * * *